(12) United States Patent
Nevalainen et al.

(10) Patent No.: US 10,214,316 B2
(45) Date of Patent: Feb. 26, 2019

(54) METHOD FOR MANUFACTURING BIODEGRADABLE PACKAGING MATERIAL, BIODEGRADABLE PACKAGING MATERIAL AND PACKAGES AND CONTAINERS MADE THEREOF

(71) Applicant: STORA ENSO OYJ, Helsinki (FI)

(72) Inventors: Kimmo Nevalainen, Kotka (FI); Ville Ribu, Lappeenranta (FI); Jurkka Kuusipalo, Tampere (FI); Sami Kotkamo, Tampere (FI)

(73) Assignee: STORA ENSO OYJ, Helsinki (FI)

( * ) Notice: Subject to any disclaimer, the term of this patent is extended or adjusted under 35 U.S.C. 154(b) by 377 days.

(21) Appl. No.: 14/438,180

(22) PCT Filed: Oct. 23, 2013

(86) PCT No.: PCT/FI2013/050997
§ 371 (c)(1),
(2) Date: Apr. 23, 2015

(87) PCT Pub. No.: WO2014/064335
PCT Pub. Date: May 1, 2014

(65) Prior Publication Data
US 2015/0284133 A1 Oct. 8, 2015

(30) Foreign Application Priority Data
Oct. 26, 2012 (FI) ................................. 20126114

(51) Int. Cl.
*B65D 5/56* (2006.01)
*B05D 1/26* (2006.01)
(Continued)

(52) U.S. Cl.
CPC ............. *B65D 5/563* (2013.01); *B05D 1/265* (2013.01); *B05D 7/58* (2013.01); *B29C 47/025* (2013.01);
(Continued)

(58) Field of Classification Search
CPC D21H 19/28; D21H 19/80; Y10T 428/24942; B32B 2307/7163;
(Continued)

(56) References Cited

U.S. PATENT DOCUMENTS 6,183,814 B1  2/2001 Nangeroni et al.
2002/0065345 A1  5/2002 Narita et al.
(Continued)

FOREIGN PATENT DOCUMENTS

CN  102227459 A  10/2011
EP  1 361 044 A2  11/2003
(Continued)

OTHER PUBLICATIONS

The technical datasheet for PLA polymer 3051 D from NatureWorks available online at www.materiautech.org/content/download/1622/9161/version/3/file/MATI041.pdf on Jun. 2, 2016.*
(Continued)

*Primary Examiner* — Lee E Sanderson
(74) *Attorney, Agent, or Firm* — Patterson Thuente Pedersen, P.A.

(57) ABSTRACT

A biodegradable packaging material, a method of manufacturing the same, as well as products made of the material wherein a multilayer coating coextruded onto a fibrous substrate the multilayer coating comprising innermost and outermost layers of a blend comprising 20-95 wt-% of a higher melt index polylactide and 5-80 wt-% of another biodegradable polymer such as polybutylene succinate, and a middle layer containing a lower melt index polylactide (Continued)

alone. The goal is to increase machine speed in coextrusion while maintaining good adhesiveness to the substrate and good heat-sealability of the coating. The products include disposable drinking cups and board trays, as well as sealed carton packages for solids and liquids.

8 Claims, 6 Drawing Sheets

(51) Int. Cl.

| | | |
|---|---|---|
| B05D 7/00 | (2006.01) | |
| B32B 27/36 | (2006.01) | |
| D21H 19/28 | (2006.01) | |
| D21H 19/80 | (2006.01) | |
| B29C 47/02 | (2006.01) | |
| B29C 47/06 | (2006.01) | |
| B29C 47/92 | (2006.01) | |
| B32B 7/02 | (2006.01) | |
| B32B 27/08 | (2006.01) | |
| B32B 27/12 | (2006.01) | |
| B32B 27/30 | (2006.01) | |
| B29C 47/00 | (2006.01) | |
| C08L 101/16 | (2006.01) | |

(52) U.S. Cl.
CPC ............ *B29C 47/065* (2013.01); *B29C 47/92* (2013.01); *B32B 7/02* (2013.01); *B32B 27/08* (2013.01); *B32B 27/12* (2013.01); *B32B 27/308* (2013.01); *B32B 27/36* (2013.01); *D21H 19/28* (2013.01); *D21H 19/80* (2013.01); *B29C 47/0004* (2013.01); *B32B 2270/00* (2013.01); *B32B 2307/7163* (2013.01); *B32B 2307/726* (2013.01); *B32B 2439/02* (2013.01); *B32B 2439/70* (2013.01); *C08L 101/16* (2013.01); *Y10T 428/24942* (2015.01)

(58) Field of Classification Search
CPC .......... B32B 2307/726; B32B 2439/02; B32B 2439/70; B32B 7/02; B32B 27/08; B32B 27/12; B32B 27/308; B32B 27/36; B65D 5/563; B05D 1/265; B05D 7/58; B29C 47/025; B29C 47/065; B29C 47/92
USPC ........... 428/36.1, 36.2, 481, 34.2, 35.9, 34.1
See application file for complete search history.

(56) References Cited

U.S. PATENT DOCUMENTS

| | | |
|---|---|---|
| 2004/0248486 A1 | 12/2004 | Hodson |
| 2005/0151296 A1 | 7/2005 | Obuchi et al. |
| 2010/0323196 A1 | 12/2010 | Dou et al. |
| 2012/0201967 A1* | 8/2012 | Skupin .................. D21H 19/20 427/411 |
| 2014/0147604 A1 | 5/2014 | Nevalainen et al. |
| 2016/0010281 A1 | 1/2016 | Skupin et al. |

FOREIGN PATENT DOCUMENTS

| | | | |
|---|---|---|---|
| EP | 1 361 044 A3 | 11/2003 | |
| EP | 1 094 944 B1 | 9/2004 | |
| EP | 1094944 B1 * | 9/2004 | ............ B32B 27/10 |
| FI | 20105247 A | 9/2011 | |
| WO | WO 2009/064052 A1 | 5/2009 | |
| WO | WO 2010/034712 A1 | 4/2010 | |
| WO | WO 2011/110750 A1 | 9/2011 | |
| WO | WO 2013/007872 A1 | 1/2013 | |

OTHER PUBLICATIONS

Technical datasheet for Ingeo Biopolymer 3251D from NatureWorks available online at http://www.natureworksllc.com/~/media/Files/NatureWorks/Technical-Documents/Technical-Data-Sheets/TechnicalDataSheet_3251D_injection-molding_pdf.pdf on 2 Jun. 2016.*
Cheremisinoff, Nicholas P. Product Design and Testing of Polymeric Materials. Dekker, 1990; p. 8.*
Supplementary European Search Report for Application No. 13849837.3 dated Jun. 23, 2016.
Application and File History for U.S. Appl. No. 14/438,139, filed Apr. 23, 2015, inventors Kimmo Nevalainen et al.
International Search Report and Written Opinion for PCT/FI2013/051015, dated Jan. 22, 2014, 17 pgs.
FI Office Action for Finnish Patent Application No. 20126113, dated Aug. 13, 2013, 6 pgs.
FI Search Report for Finnish Patent Application No. 20126113, dated Aug. 13, 2013, 1 pg.
International Search Report and Written Opinion for PCT/FI2013/050997, dated Jan. 23, 2014, 17 pgs.
FI Office Action for Finnish Patent Application No. 20126114, dated Aug. 13, 2013, 6 pgs.
FI Search Report for Finnish Patent Application No. 20126114, dated Aug. 13, 2013, 1 pg.
Ingeo™_Resin Product Guide, © 2011 NatureWorks LLC, 4 pgs.
English and Chinese languages of Shen, "Principles of Polymer Materials Processing", dated Jul. 31, 2000, 15 pages.
English and Chinese language of Office Action for Chinese Application No. 201380067835.2 dated Dec. 25, 2015.

* cited by examiner

| PLA2 + PBS | ~ 2 |
| --- | --- |
| BOARD | ~ 1 | b)

| PLA2 + PBS | ~ 2 |
| --- | --- |
| BOARD | ~ 1 |
| PLA2 + PBS | ~ 2 | c)

| PLA2 + PBS | ~ 4 |
| --- | --- |
| PLA1 | ~ 3 |
| PLA2 + PBS | ~ 2 |
| BOARD | ~ 1 | d)

| PLA2 + PBS | ~ 4 |
| --- | --- |
| PLA1 | ~ 3 |
| PLA2 + PBS | ~ 2 |
| BOARD | ~ 1 |
| PLA2 + PBS | ~ 2 |
| PLA1 | ~ 3 |
| PLA2 + PBS | ~ 4 | e)

| PLA2 + PBAT | ~ 5 |
| --- | --- |
| PLA1 | ~ 3 |
| PLA2 + PBS | ~ 2 |
| BOARD | ~ 1 |

Fig. 6

METHOD FOR MANUFACTURING BIODEGRADABLE PACKAGING MATERIAL, BIODEGRADABLE PACKAGING MATERIAL AND PACKAGES AND CONTAINERS MADE THEREOF

RELATED APPLICATIONS

This application is a National Phase entry of PCT Application No. PCT/FI2013/050997, filed Oct. 23, 2013, which claims priority from Finland Application No. 20126114, filed Oct. 26, 2012, the disclosures of which are hereby incorporated by referenced herein in their entirety.

FIELD OF THE INVENTION

The present invention is generally related to a method of manufacturing a biodegradable packaging material comprising coextrusion onto a fibrous substrate a multilayer polymer coating. The present invention is also generally related to biodegradable packaging material obtained by said method as well as containers and product packages comprising the packaging material according to the present invention.

BACKGROUND OF THE INVENTION

The fibre-based packaging material of product packages, such as packing paper or board, is usually provided with a polymeric coating that makes the package tight and allows closing the package by heat sealing. Similar polymer-coated paper or board is also used for disposable tableware, such as drinking cups. Polyolefins, such as low-density polyethylene (LDPE), are widely used for coating due to their good heat-sealability. A disadvantage of the usual polyolefins is, however, that they are not biodegradable.

Polylactide (PLA), which has reasonably good moisture and gas barrier properties that are sufficient to many applications, has been used as the coating polymer of biodegradable packaging material; however, its use involves a number of problems. Standard low melt index polylactide is stiff and fragile, requiring a high extrusion temperature and a fairly large layer thickness to stick to the fibre substrate of the packaging material. Because of the high temperature, such polylactide runs the risk of deterioration, and in extrusion, the edges of a molten web tend to tear and pin holes easily remain in the extruded layer. This also results in a low machine speed.

To solve the extrusion problems, EP-1094944 B1 discloses an inner adhesion layer, which is co-extruded together with an outer polylactide layer, and which consists of a biodegradable polymer, examples of which, according to the specification, include some commercial copolyesters, cellulose esters, and polyester amides.

Another problem with the use of low melt index polylactide in the outer coating layer of the packaging material is its fairly high melting point, and the resulting poor heat-sealability. As an improvement to this, US-2002/0065345 A1 discloses a biodegradable aliphatic polyester that is blended with polylactide, its portion in the mixture being at least 9%, and a tackifier, its portion in the mixture being at least 1%. As suitable aliphatic polyesters, the publication mentions polycaprolactone (PLC) and polybutylene succinate adipate (PBSA). According to the reference, the mixture can be extruded into a film, which can be axially or biaxially stretched, and which can be attached to the fibre substrate by lamination.

In general, adhesivity to a fibrous base and heat-sealability of PLA may be improved by blending with selected polymeric additives, but these have posed various problems limiting their use. There are non-biodegradable polymers, which can only be used in small amounts so as not to spoil the overall biodegradability of the PLA-based coating layer. Other polymers, which are biodegradable, may be used in larger amounts, but even then problems with runnability on the extrusion coating machine may limit their use.

US 2014/0147604 A1 teaches that a coating containing at least 70 weight-% of polylactide and at least 5 weight-% of polybutylene succinate (PBS) or a derivate thereof has an improved adhesion to the fibrous substrate and reduced raw edge penetration (REP). The high share of 70% or more of PLA is necessary for runnability of the extrusion coating process in a coating machine. Therefore there is an upper limit of 30 wt-% for the share of PBS, even though increasing the PBS share would otherwise be desirable for further improving heat-sealability.

PLA used for coating fibrous packaging materials has usually been low melt index PLA having a melt index at most 25 g/10 min (210° C.; 2.16 kg), due to its suitability for extrusion coating. High melt index PLA is too viscous for being extruded as such. Blending high melt index PLA with other stiffer polymers improves extrudability, while the polymeric additive may be selected from such biodegradable polymers which provide improved adhesion and heat-sealing properties for the blend. At the same time, the share of the added polymer may be raised considerably higher than with standard low melt index PLA.

In WO 2010/034712 A1 there is disclosed a triple layer coating on a fibrous base, comprising innermost and outermost layers of PLA blended with biodegradable polyester as well as a middle layer of either such a blend or mere PLA. The polyester of choice is polybutylene adipate terephthalate (PBAT), but there may also be an amount of other polyesters such as PBS. The PLA used for the multilayer structure is NatureWorks 3251 D, which is a high melt index PLA. This means that the teaching of a middle layer of 100% PLA is in practice unworkable. There must be polyester blended with PLA to turn the material extrudable. In a working example, the share of PLA in the middle layer is 80% and in the inner and outer layers 60%. The stiffer inner and outer layers thus serve to support the looser inner layer in coextrusion.

There still remains a need of improving machine speed in coextrusion processes, while preserving good adhesion and heat-sealing properties of the resulting polymer coated fibrous packaging materials. These objects should be achieved with improved economy and without compromising environmental aspects of the resulting product.

SUMMARY OF THE INVENTION

The aim of the present inventors was to find a faster method for multilayer polymer coating of fibrous packaging material. Particularly the aim has been to improve runnability of the paper or board machinery. Further, the aim was to find a coated fibrous packaging material, in which the multilayer coating has good adhesivity to the fibrous substrate, which can be heat-sealed without difficulty, and which brings in reduced material costs.

The solution according to certain aspects of the present invention is coextrusion onto a fibrous substrate a multilayer coating comprising (i) an innermost layer of a blend comprising 20-95 wt-% of a first polylactide and 5-80 wt-% of another biodegradable polymer, (ii) a middle layer containing a second polylactide, and (iii) an outermost layer of a blend comprising 20-95 wt-% of a third polylactide and 5-80 wt-% of another biodegradable polymer, the second polylactide having melt index lower than that of the first and the third polylactide.

According to certain aspects of the present invention, said first and third polylactides are preferably one and the same higher melt index polylactide. Also, said other biodegradable polymer in the blends of the innermost and outermost layers preferably is one and the same polymer. Thus the same polymer blend may be used for both the innermost and the outermost coating layer, which considerably simplifies the coextrusion process.

The present invention may comprise coextrusion onto a fibrous substrate a multilayer coating comprising (i) an innermost layer of a blend comprising 20-95 wt-% of polylactide having a higher melt index of more than 35 g/10 min (210° C.; 2.16 kg) and 5-80 wt-% of another biodegradable polymer, (ii) a middle layer containing polylactide having a lower melt index of 5-35 g/10 min (210° C.; 2.16 kg), and (iii) an outermost layer of a blend comprising 20-95 wt-% of polylactide having a higher melt index of more than 35 g/10 min (210° C.; 2.16 kg) and 5-80 wt-% of another biodegradable polymer. Once again, in some aspects the same blend may advantageously be used for the innermost and the outermost coating layers.

According to certain aspects of the present invention, a stiffer layer of lower melt index PLA is incorporated as a middle layer of the multilayer structure, to support looser higher melt index PLA blend layers and thereby improve their coextrudability. The solution allows sufficient machine speed in the coextrusion process. Use of standard low melt index PLA improves controllability of the extrusion process, while the criticality of the share of PLA in the inner and outer layers is reduced and there will be enhanced window for varying the respective blends for optimal adhesivity and heat-selability. In general, use of higher melt index PLA allows increasing the share of another biodegradable polymer, preferably biodegradable polyester, in the blends, thereby enhancing heat-sealing and adhesion properties while preserving runnability of the extrusion machinery.

According to certain aspects of the present invention, the blends comprising 20-95 wt-% of higher melt index polylactide and 5-80 wt-% of another biodegradable polymer as used for the inner and outer polymer coating layers may be the same or different. Optionally, other components may be included in the blend(s), provided that biodegradability of the coating layer is preserved. The coating polymers may be produced from raw materials obtained from essentially biorenewable natural sources.

Another aspect of the present invention is a biodegradable packaging material. According to certain aspects of the present invention, said material comprises a fibrous substrate and a coextruded multilayer coating comprising (i) an innermost layer of a blend comprising 20-95 wt-% of a first polylactide and 5-80 wt-% of another biodegradable polymer, (ii) a middle layer containing a second polylactide, and (iii) an outermost layer of a blend comprising 20-95 wt-% of a third polylactide and 5-80 wt-% of another biodegradable polymer, the second polylactide having melt index lower than that of the first and the third polylactide. According to certain aspects of the present invention, said first and said third polylactide are preferably one and the same higher melt index polylactide.

According to certain aspects of the present invention, the multilayer coating preferably comprises (i) an innermost layer of a blend comprising 20-95 wt-% of polylactide having a higher melt index of more than 35 g/10 min (210° C.; 2.16 kg) and 5-80 wt-% of another biodegradable polymer, (ii) a middle layer containing polylactide having a lower melt index of 5-35 g/10 min (210° C.; 2.16 kg), and (iii) an outermost layer of a blend comprising 20-95 wt-% of polylactide having a higher melt index of more than 35 g/10 min (210° C.; 2.16 kg) and 5-80 wt-% of another biodegradable polymer. Said blending of polymers provides a multilayer structure with good adhesion and heat-sealing properties.

Further aspects of the present invention are a drinking cup, a sealed liquid package, a sealed carton package, and a tray package for ready-made food. Characteristic to said products is that they are made of a packaging material manufactured by the method of the present invention or of a packaging material of the present invention as described above. In the case of a disposable drinking cup or a liquid package, the polymer coating is lying at least on the inner liquid-contact side of the cup or package. In a tray, the polymer coating covers at least the upper food-contact side of the tray. In a carton package for dry products, the polymer coating may cover the outer surface of the package, protecting the fibrous substrate and the product against wetting from the outside. However, in each case the cup, tray or package may be provided with at least one polymer coating layer on both sides of the packaging material.

In certain aspects of the present invention, a method of manufacturing a biodegradable packaging material comprises coextrusion onto a fibrous substrate a multilayer coating comprising (i) an innermost layer of a blend comprising 20-95 wt-% of a first polylactide and 5-80 wt-% of another biodegradable polymer, (ii) a middle layer containing a second polylactide, and (iii) an outermost layer of a blend comprising 20-95 wt-% of a third polylactide and 5-80 wt-% of another biodegradable polymer, wherein the second polylactide having a melt index lower than that of the first and the third polylactide.

In certain aspects of the present invention, the first polylactide has a higher melt index of more than 35 g/10 min (210° C.; 2.16 kg), the second polylactide has a lower melt index of 5-35 g/10 min (210° C.; 2.16 kg), and the third polylactide has a higher melt index of more than 35 g/10 min (210° C.; 2.16 kg). In certain aspects, the first and third polylactides preferably are the same.

In certain aspects of the present invention, the blend of the innermost and/or outermost layer comprises 30-60 wt-% of higher melt index polylactide, 40-70 wt-% of another biodegradable polymer, and 0-5 wt-% of an acrylic copolymer.

In certain aspects of the present invention, said another biodegradable polymer of the innermost and/or outermost layer is a polyester. In certain other aspects of the present invention, said another biodegradable polymer is polybutylene succinate (PBS) or a derivate thereof.

In certain aspects of the present invention, the higher melt index polylactide of the innermost and/or outermost layer has a melt index of 50-100, preferably 70-85 g/10 min (210° C.; 2.16 kg).

In certain aspects of the present invention, the same blend is extruded as the innermost and the outermost layer of the multilayer coating.

In certain aspects of the present invention, the components of the blends are melted and blended in connection with the extrusion step.

In certain aspects of the present invention, the machine speed in coextrusion is at least 100 m/min, in some aspects at least 150 m/min, in some other aspects at least 200 m/min, and some other most preferable aspects at least 250 m/min.

In certain aspects of the present invention, a biodegradable packaging material comprises a fibrous substrate and a coextruded multilayer coating, the coextruded multilayer coating comprising (i) an innermost layer of a blend comprising 20-95 wt-% of a first polylactide and 5-80 wt-% of another biodegradable polymer, (ii) a middle layer containing a second polylactide, and (iii) an outermost layer of a blend comprising 20-95 wt-% of a third polylactide and 5-80 wt-% of another biodegradable polymer, wherein the second polylactide having a melt index that is lower than that of the first and the third polylactide.

In certain aspects of the present invention, the first polylactide has a higher melt index of more than 35 g/10 min (210° C.; 2.16 kg), the second polylactide has a lower melt index of 5-35 g/10 min (210° C.; 2.16 kg), and the third polylactide has a higher melt index of more than 35 g/10 min (210° C.; 2.16 kg). In certain other aspects, the first and third polylactides are preferably the same.

In certain aspects of the present invention, the same blend has been used for the innermost and the outermost layers of the multilayer coating.

In certain aspects of the present invention, the coextruded multilayer coating includes innermost and outermost layers of a blend comprising 30-60 wt-% of polylactide having a higher melt index of 50-100 g/10 min (210° C.; 2.16 kg), 40-70 wt-% of said another biodegradable polymer, and 0-5 wt-% of an acrylic copolymer, and a middle layer of said lower melt index polylactide.

In certain aspects of the present invention, the coextruded multilayer coating is provided on the inner liquid-contact side of a cup. In some other aspects, the coextruded multilayer coating is provided on the inner liquid-contact side of a package. In some other aspects, the coextruded multilayer coating is provided on the outside of the a sealed carton package. In still some other aspects, the coextruded multilayer coating is used in a track package for ready-made food, with the coextruded multilayer coating on the food-contact side of the tray.

The above summary of the various representative aspects and embodiments of the present invention is not intended to describe each illustrated aspect or embodiment or every implementation of the present invention. Rather, the aspects and embodiments are chosen and described so that others skilled in the art can appreciate and understand the principles and practices of the present invention. The figures in the detailed description that follow more particularly exemplify these aspects and embodiments.

BRIEF DESCRIPTION OF THE FIGURES

The invention can be completely understood in consideration of the following detailed description of various aspects and embodiments of the present invention in connection with the accompanying drawings, in which.

DETAILED DESCRIPTION OF THE PRESENT INVENTION

The present invention is based on a surprising finding that runnability of an extrusion coating machine producing the material can be improved while heat sealability of the polymer-coated material may at least be maintained by using PLA having a higher melt index in a polymer blend with another biodegradable polymer for inner and outer layers and lower melt index PLA as such for a middle layer of a multilayer coating.

As an overall rule, the melt index and the molecular weight (MW) of PLA are in reverse ratio to each other, i.e. as the melt index increases the MW decreases. In general, the lower melt index PLA as used in the present invention has a MW of at least 160 000 and, accordingly, higher melt index PLA as used in the invention has a MW of less than 160 000.

Preferably, the lower melt index PLA as used has a MW of about 200 000 and the higher melt index PLA has a MW of about 100 000.

A biodegradable packaging material is manufactured by coextruding onto a fibrous substrate inner, middle and outer coating layers. According to the present invention, the inner and outer layer contain a blend comprising polylactide having a melt index >35 g/10 min (210° C.; 2.16 kg) and another biodegradable polymer, preferably a biodegradable polyester.

Optionally, the blend may comprise even other components, for instance acrylic copolymers, which shall not destroy the overall biodegradability of the coating layer, however.

The fibrous substrate in the packaging material may be paper or board, paper-board as well as cardboard.

Amount of said polylactide having a melt index >35 g/10 min in said blend is 20-95 wt-%, preferably 30-60 wt-%.

Melt index of said polylactide is >35 g/10 min, preferably >40 g/10 min, and more preferably 50-100 g/10 min, still more preferably 60-90 g/10 min and most preferably even 70-85 g/10 min (210° C.; 2.16 kg). The inventors have demonstrated that PLA having high melt index allows blending of a higher share of another biodegradable polymer such as polyester to the coating and allows using higher machine speeds in the extrusion process.

Up to now the PLA used for coating fibrous substrates has in most cases had a molecular weight of about 200 000 g/mol and a melt index at most about 25 g/10 min (210° C.; 2.16 kg). Within the meaning of the present invention, the phrase "high melt index PLA" refers to PLA with a melting index, which is more than 35 g/10 min (210° C.; 2.16 kg), and a molecular weight reduced, preferably by at least about 40%, compared to traditionally used low melt index PLA.

Further, PLA can be produced by using renewable starting material. It is also biodegradable e.g. in composting and can be burned.

A suitable biodegradable polymer for use in the present invention, as a blend with high melt index PLA, may be selected from polyhydroxyalkanoate (PHA), poly(butylene succinate adipate) (PBSA), polybutylene succinate (PBS), polycaprolactone (PCL), polyglycolic acid (PGA), poly(butyl acrylate) (PBA), poly(butylene adipate-co-terephthalate) (PBAT), poly(butylene succinate-co-terephthalate) (PBST) polyhydroxybutyrate co-hydroxyvalerates (PHBV), poly(vinylalcohol) (PVOH), polycaprolactonee (PCL), polyetylene (PE), poly(trimethylene terephthalate) (PTT) and polybutylene terephthalate (PBT). Preferably the polymer is a polyester, most preferably PBS or its derivate.

Within the meaning of the present invention, the term "biodegradable" means polymers that will decompose in natural aerobic (composting) and anaerobic (landfill) environments. Biodegradation of polymers occurs when microorganisms metabolize the polymer to either assimilable compounds or to humus-like materials that are less harmful to the environment. They may be derived from renewable raw materials, or petroleum-based plastics which contain additives. Aromatic polyesters are almost totally resistant to microbial attack, most aliphatic polyesters are biodegradable due to their potentially hydrolysable ester bonds. Examples of biodegradable polyesters are polybutylene succinate (PBS) and polycaprolactone (PCL).

Polyester may be a bio-polyester. Within the meaning of the present invention, the term "bio-polyester" covers any polyester that can be manufactured from renewable natural resources such as corn, potato, tapioca, cellulose, soy protein, lactic acid etc., or can be naturally produced (e.g. by microbial fermentation), and which are biodegradable or compostable. Examples of biopolyesters of natural origin are Polyhydroxyalkanoates (PHAs) like the poly-3-hydroxybutyrate (PHB), polyhydroxyvalerate (PHV) and polyhydroxyhexanoate (PHH). Biodegradable or compostable polyesters such as PBS may be bio-polyesters but may even be of fossil (petroleum) origin.

Amount of the biodegradable polymer in the blend is 5-80 wt-%, preferably 40-70 wt % and most preferably 45-65 wt-%. Preferably the polymer is a biodegradable polyester. Polyester improves the adhesion properties of the coating as well as heat-sealablility.

Within the meaning of the present invention, the term "adhesion" means adhesion to any surface including fibrous material and polymer coated surface but particularly it means adhesion to raw fibrous material (paper or board) constituting the fibrous substrate. The aim is to achieve complete adhesion, which means that an attempt to detach the coating results in breaking within the fibrous substrate layer, instead of the coating peeling off as a whole.

Within the meaning of the present invention, the term "heat-sealability" means that the polymer coating in softened or melted condition may be attached to an opposite surface of material, which may be the same or another polymer, raw fibrous material etc. A firm seal between the surfaces is formed as the heated polymer cools down and solidifies. When a polymer blend is used in accordance with the present invention, an acceptable heat-sealing can be achieved within a broader temperature range than in case PLA alone is used.

A major advantage of the method according to the present invention is improved runnability of the coating machinery, i.e. sufficient extrusion and adhesion properties allow using a high machine speed in spite of use of the high melt index PLA.

In the method, the machine speed in extrusion is at least 100 m/min. Preferably the machine speed is at least 150 m/min, more preferably at least 200 m/min, still more preferably at least 250 m/min and most preferably at least 300 m/min. The high machine speed improves the economy of the manufacturing process.

As a preferable third component the blend may comprise a minor amount, at most about 5% by weight, an acrylate copolymer, such as ethylene butyl acrylate glycidyl methacrylate terpolymer (EBAGMA). The packaging material of the invention may thus comprise an innermost and/or an outermost coating layer containing a blend of (i) 30 to 60 weight-% of high melt index polylactide, (ii) 40 to 70 weight-%, of another biodegradable polymer such as polyester, and (iii) 0 to 5 weight-% of an acrylate copolymer. Presence of further components in the blend is not excluded, provided that the biodegradability of the coating layer is not compromised.

The acrylate polymer is added to further improve the adhesion of the extruded polymer coating layer to the fibrous substrate. Acrylate polymers, including EBAGMA, are as such non-biodegradable, but when used in small amounts of 5 weight-% at most do not prevent disintegration of the coating layer as a whole.

According to the present invention, the preferred biodegradable polymer blended with PLA is polybutylene succinate (PBS). The specific advantage of PBS is superior blendability with high melt index PLA in the extruder, into which PBS and PLA granules may be fed separately. Biodegradable derivates of polybutylene succinate are an alternative, in particular polybutylene succinate adipate (PBSA).

A polyester blended with PLA improves adhesion of a coating layer consisting of the blend in extrusion onto a fibrous board substrate. At the same time, raw edge penetration of liquid in drinking cups made of the coated packaging material according to the present invention is significantly reduced in comparison with PLA alone, which in case of hot coffee is seen as markedly less, if any, brown colouring along the vertical heat-seal lines in the cup jacket. The improved adhesion is also supposed to increase the ability of the coating to withstand the vapour pressure generated within the fibrous substrate by the hot drink, thus preventing the coating from loosening from the substrate layer and opening pathways to liquid penetration.

According to certain aspects of the present invention, another suitable biodegradable polymer blended with PLA is polybutylene adipate terephtalate (PBAT).

In addition to good adhesion and heat-sealing properties and extrudability as blends with PLA, preferred polymers PBS, PBSA and PBAT are biodegradable and PBS in particular can be manufactured from raw materials obtained from renewable natural sources.

A biodegradable polymer blend as discussed above may advantageously be extruded as the uppermost surface layer of the coated packaging material. In this case, the polyester, such as PBS or its derivate, serves to improve the heat-sealability of the polymer coated packaging material. Addition of a minor amount of acrylate copolymer, such as EBAGMA, further improves heat-sealability of the coating layer.

A biodegradable polymer blend as discussed above may advantageously be extruded into a direct contact with the fibrous substrate of the packaging material. Due to good adhesion properties, there is no need to use separate adhesion layers between the fibrous substrate and the coating of the present invention. This simplifies the manufacturing process and reduces raw material costs. The polyester, such as PBS or its derivate, serves to improve adhesion of the coating layer to the underlying fibrous substrate. In the multilayer coating, said coating layer is the lowermost layer.

In the coextruded multilayer coating, each layer should substantially consist of biodegradable polymers, which preferably are based on renewable raw materials. The material may have a polymer coating on one side or on both sides thereof. The coatings on the opposite sides of the fibrous substrate may be similar or differ from each other, for instance a multilayer coating according to the invention on one side and a monolayer coating, of a blend of high melt index PLA and PBS for instance, on the opposite side.

Preferably the components of the blend are melted and blended in connection with the extrusion step, more specifically the components of the polymer blend are mixed as granules and melted at a single step, immediately followed by extrusion of the melt onto a paper or board substrate. This works especially well with high melt index PLA and PBS or its derivate. Mixing of the components first in the extruder allows easy adjustment of the shares of the components being mixed, an advantage over use of premade compounded blends. Availability of granulate PLA and polyesters is good and typically also the price is lower compared to preblended compounds.

The total amount of polymer coating on one side of the fibrous substrate may be in the range of 10-60 $g/m^2$, typically about 25 $g/m^2$. In the multilayer coating the amount of polymer per layer may be 4-20 $g/m^2$, preferably 6-15 $g/m^2$. A representative example could be a triple layer coating with a middle layer of solely low melt index PLA and coating layer weights of 7, 11 and 7 $g/m^2$, respectively.

A useful embodiment of the present invention is a packaging material having coextruded inner, middle and outer coating layers, the inner and outer layer comprising a blend of 20-95 wt-% of PLA having a melt index of above 35 g/10 min (210° C.; 2.16 kg), 5-80 wt-% of a biodegradable polyester such as PBS and, optionally, 0-5 wt-% of an acrylic copolymer such as EBAGMA, and the middle layer comprising polylactide having a melt index of 5-35 g/10 min (210° C.; 2.16 kg). The inner layer would provide superior adhesion in extrusion to the fibrous substrate and the outer layer would provide superior heat-sealability to an uncoated fibrous surface or to a polymer layer, similar or dissimilar to said outer heat-seal layer itself. Middle layer containing PLA with low melting index supports the polymer layers during extrusion process. PLA is also renewable and useful material having e.g. good moisture barrier properties as well as low cost. Multilayered structure allows optimizing the raw material without compromising the extrudability or properties of the resulting coating.

In a preferred embodiment of the present invention, said packaging material comprises a fibrous substrate and an extruded multilayer coating including innermost and outermost layers of a blend of 30-60 wt-% of polylactide having a melt index of 50-100 g/10 min (210° C.; 2.16 kg), 40-70 wt-% of a biodegradable polyester, and 0-5 wt-% of an acrylic copolymer, and a middle layer of polylactide having a melt index of 5-35 g/10 min (210° C.; 2.16 kg). The same blend is advantageously used for the innermost and outermost layers.

The present invention further provides improved containers made of the packaging material as described above. Disposable drinking cups for hot drinks, especially hot coffee, are a prime example of such containers.

According to the present invention a drinking cup made of a packaging material manufactured by the method of the invention, or of a packaging material of the invention, has the polymer coating lying on the inner liquid-contact side of the cup.

According to the present invention a sealed liquid package of a packaging material manufactured by the method of the present invention, or of a packaging material of the present invention, has the polymer coating lying on the inner liquid-contact side of the package. However, a similar package is even useful as a carton package for dry products.

According to the present invention, a sealed carton package of a packaging material manufactured by the method of the present invention, or of a packaging material of the present invention, may have the polymer coating lying on the outside of the package.

According to the present invention, a tray package for ready-made food, the tray being made of a packaging material manufactured by the method of present the invention, or of a packaging material of the present invention, has the polymer coating lying on the foodcontacting upper side of the tray.

The product packages according to the present invention are preferably completely made of the packaging material as described above. In each case even the reverse side of the packaging material may be polymer-coated, e.g. for improving heat-sealability or for gas or aroma barrier purposes. Preferably the polymer blended with high melt index PLA in said products is a biodegradable polyester.

EXAMPLES

FIGS. 6a-6c show as examples five structural embodiments of comparative packaging materials (FIGS. 6a and 6b) and packaging materials according to the present invention (FIGS. 6c-6e). "PLA1" means low melt index PLA; "PLA2" means high melt index PLA; "PBS" means polybutylene succinate and "board" indicates the fibrous substrate layer. Instead of PBS even other biodegradable polymers may be used.

There are extruded or coextruded monolayer or multilayer coatings of a blend of PLA2 and PBS and mere PLA1 on one side or on both sides of a fibrous paper or board substrate ("board"). The share of PLA2 in the blend is 20 to 95 weight-%, preferably 30 to 60 weight-%, and the share of PBS may vary from 5 to 80 weight-%, preferably being 40 to 70 weight-%. As an optional third component at most 5 weight-% of an acrylate copolymer such as ethylene butyl acrylate glycidyl methacrylate terpolymer (EBAGMA) may be included in the blend. The substrate may be paper, paperboard or cardboard of a weight of 40 to 350 $g/m^2$, preferably a cupboard or a liquid package board of 170 to 350 $g/m^2$.

It is understood to a skilled reader that if the packaging material has extruded polymer coatings on both sides, the coatings on the opposite sides need not be identical. There may be a mono-layer coating on one side and a multilayer coating on the other side of the fibrous substrate. It is also possible to include in multilayer coatings layers of other biodegradable polymers suitable for extrusion coating, preferably in blends with high melt index polylactide.

Usefully PBS is available as a commercial product under trade name GsPLA FZ91PD by Mitsubishi, and EBAGMA is commercially available under trade name Biomax Strong 120 by DuPont.

More particularly, FIG. 6a shows the substrate 1 with a single extruded coating layer 2 of the blend of PLA2 and PBS. The weight of this monolayer 2 may be from 10 to 30 $g/m^2$. In FIG. 6b there is such a PLA2+PBS blend layer 2 on both sides of the substrate 1.

FIG. 6c accords with the present invention by showing a coextruded multilayer coating with an innermost PLA2+

PBS blend layer 2, a middle layer 3 of PLA1, and an outermost PLA2+PBS blend layer 4. The weight of each of the three layers 2, 3, 4 may be from 4 to 13 g/m². The total weight of the multilayer coating is thus 12-39 g/m². Including a middle layer 3 of mere PLA1 serves to add to the total thickness of the coating while improving its extrudability. FIG. 6d shows similar multilayer coatings 2, 3, 4 on both sides of the substrate 1.

FIG. 6e shows as a further embodiment of the present invention a packaging material comprising a board substrate 1 and coextruded innermost, middle and outermost coating layers 2, 3, 5. Only the innermost layer 2 consists of a PLA2+PBS blend as described above. The middle layer 3 consists of mere PLA1. The outermost heat-sealing layer 5 comprises a blend of about 45 weight-% of PLA2 and 55 weight-% of polybutylene adipate terephtalate (PBAT). The weights of the three coating layers 2, 3, 5 may correspond to the respective layers 2, 3, 4 in the embodiment of FIG. 6c.

If the packaging material has extruded polymer coatings on both sides, the coatings on the opposite sides need not be identical. There may be a monolayer coating on one side and a multilayer coating on the other side of the fibrous substrate. It is also possible to include in multilayer coatings layers of other biodegradable polymers suitable for extrusion coating, preferably in blends with PLA2. FIG. 6e is an example of such embodiments. In addition to PBAT, other examples of useful polymers are PHA (polyhydroxy alkanoate), PHB (polyhydroxy butyrate), PHBV (polyhydroxybutyrate hydroxyvalerate), PGA (polyglycolic acid), PEG (polyethylene glycol), PCL (polycaprolactane), and starch based biopolymers. The innermost layer of the multilayer structure shall be of the blend containing PLA and PBS or its derivate, however.

Tests

In the following, the present invention is illustrated by means of laboratory tests. Extrusion grade polylactides having "low" or "high" melt indexes (see Table 1 below) and polybutylene succinate (PBS) were used as coating polymers as such or blended as shown in Table 2. The blends as well as pure PLA (used also as a reference) were then extruded as monolayers or as three layered structures onto one side of a board substrate having a weight of 280 g/m². True coating weights in both monolayer and three layer structures were measured. Due to the coating techniques they varied slightly, between 24.9 and 27.6 g/m² (about 25 g/m²).

TABLE 1

Characteristics of the polymers used in experimental part.

| Polymer | melting index | temperature |
|---|---|---|
| PLA1 | 25 g/10 min; "low" | 210° C. |
| PLA2 | 75 g/10 min; "high" | 210° C. |
| PBS | 4.5 g/10 min | 190° C. |

For each coated test material the runnability of the coating machine and adhesion and heat-sealing properties of the resulting coating were measured.

Adhesion to the board substrate was determined on a scale from 0 to 5, the highest figure representing the best adhesion. The polymeric coatings were thus introduced onto the substrate by extrusion, and their adhesion to the board surface was defined on said scale, whereby the classification was as follows:

1=no adhesion, the polymeric layer peels off;
2=poor adhesion, some fibres are stuck to the polymeric layer that peels off;
3=poor adhesion, when detaching the polymeric layer, less than 50% of the paper board breaks in the area of coating;
4=moderate adhesion, when detaching the polymeric layer, over 50% of the paper board breaks in the area of coating;
5=perfect adhesion, when detaching the polymeric layer, the paper board breaks throughout the area of coating.

Heat-sealability is given as the lowest sealing temperature providing successful sealing between the heat-seal layer and a countersurface, in the tests the heat-seal layer itself. The criterium is that an attempt to tear open the seal results in a break in the fibrous board substrate instead of opening of the seal.

Runnability is given as the lowest operable machine speed in extrusion or coextrusion.

TABLE 2

Figure 6:
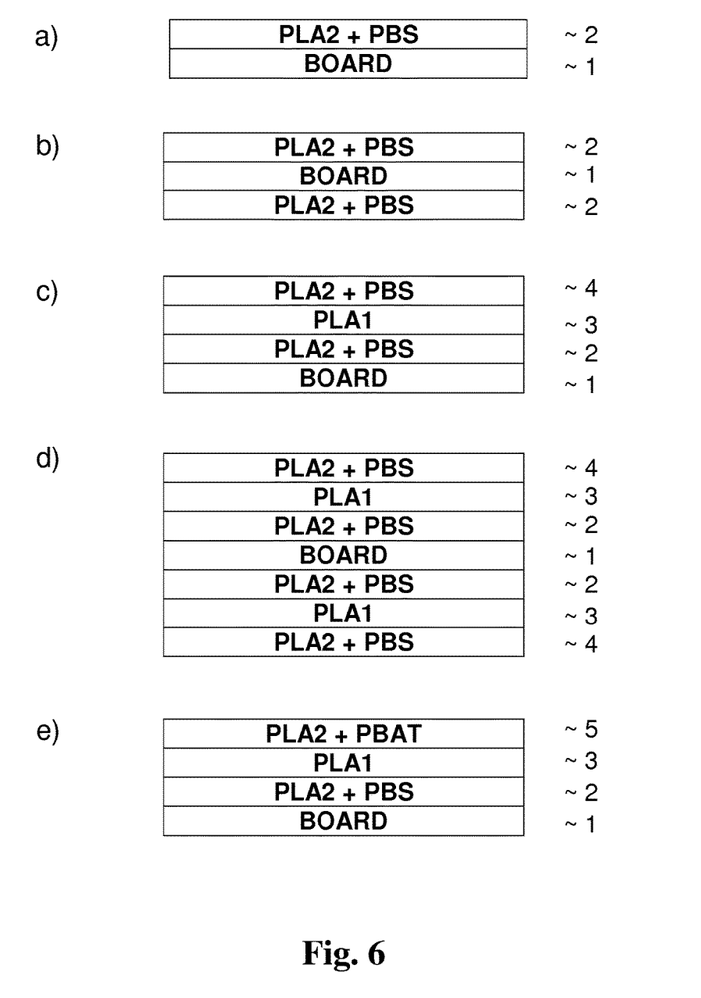
FIGS. 6a-6b show as examples two structural embodiments of comparative packaging materials.
FIGS. 6c-6e show as examples three structural embodiments of the packaging material according to the present invention.

The adhesion, heat-sealablity and runnability (coating machine speed) results of monolayer and three layer coatings applied on board substrate. PLA1 is conventionally used PLA having melt index (about 25 g/10 min) and PLA2 has high melt index (about 75 g/10 min). Column at right, when applicable, refers to the general structure as shown in FIG. 6.

|  | Adhesion | Heat-sealability (° C.) | Runnability (m/min) | FIG. |
|---|---|---|---|---|
| Board/10% PBS + PLA1 | 4 | 440 | 290 |  |
| Board/15% PBS + PLA1 | — | — | — |  |
| Board/20% PBS + PLA1 | — | — | — |  |
| Board/20% PBS + PLA2 | 4.5 | 380 | 100 | 6a |
| Board/40% PBS + PLA2 | 4.5 | 400 | 240 | 6a |
| Board/60% PBS + PLA2 | 4 | 410 | 100 | 6a |
| Board/20% PBS + PLA1/ PLA1/20% PBS + PLA1 | 5 | 460 | 250 |  |
| Board/40% PBS + PLA1/ PLA1/40% PBS + PLA1 | — | — | — |  |
| Board/60% PBS + PLA1/ PLA1/60% PBS + PLA1 | — | — | — |  |
| Board/80% PBS + PLA1/ PLA1/80% PBS + PLA1 | — | — | — |  |
| Board/20% PBS + PLA2/ PLA1/20% PBS + PLA2[1] | 5 | 410 | 270 | 6c |
| Board/40% PBS + PLA2/ PLA1/40% PBS + PLA2[1] | 5 | 410 | 320 | 6c |
| Board/60% PBS + PLA2/ PLA1/60% PBS + PLA2[1] | 5 | 380 | 300htd | 6c |
| Board/80% PBS + PLA2/ PLA1/80% PBS + PLA2[1] | 4 | 360 | 300 | 6c |
| Board/PLA2/PLA1/PLA2 | 4 | 390 | 220 |  |
| Board/PBS/PLA1/PBS | 4 | 350 | 200 |  |
| Board/PBS | 4 | 350 | 180 |  |
| Board/PLA2 | 3 | 390 | poor |  |

[1]signifies examples according to the invention, the other examples are comparative.

Lack of result implies failure in testing and thus unworkability.

Figure 1:
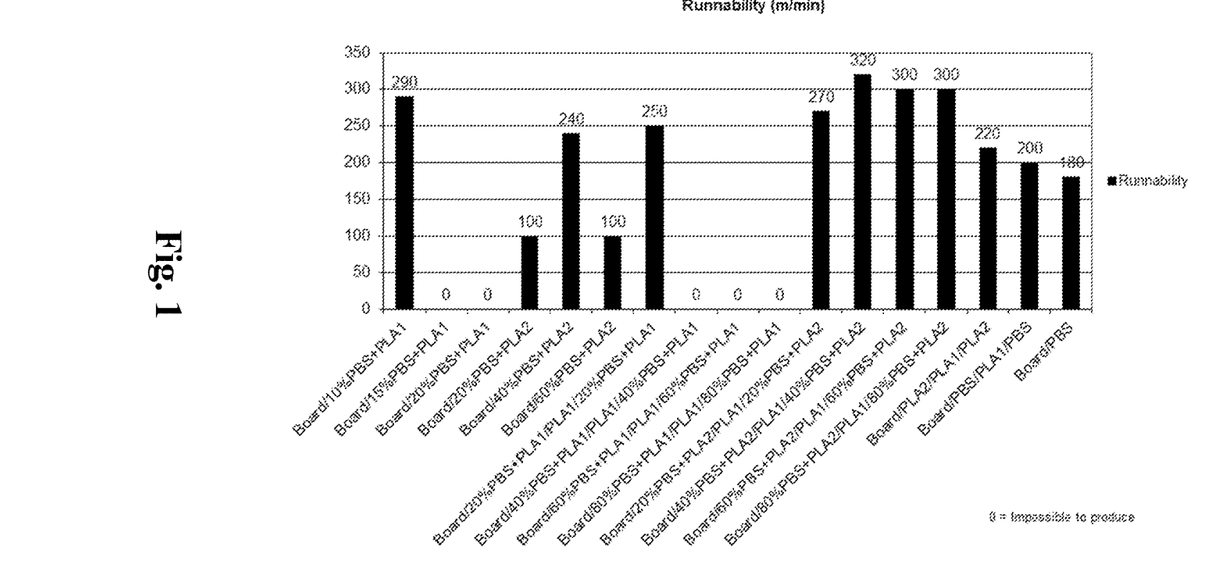
FIG. 1 is a schematic presentation of coating machine speeds (runnability) obtained in various comparative materials and embodiments according to the present invention.

The runnability results (coating machine speed) are shown in FIG. 1. It was proved that the machinery was unable to handle high (>40%) PBS concentrations by using conventional PLA (PLA1) whereas replacing conventional PLA (PLA1) with high melt index PLA (PLA2) and/or 3-layer structure (PLA1 layer in the middle and PLA2+PBS in inner and outer layer) resulted in superior runnability. Also monolayered structure using PLA2 blended with 40% PBS had good runnability. Coating could not be successfully done solely with PLA2.

Figure 2:
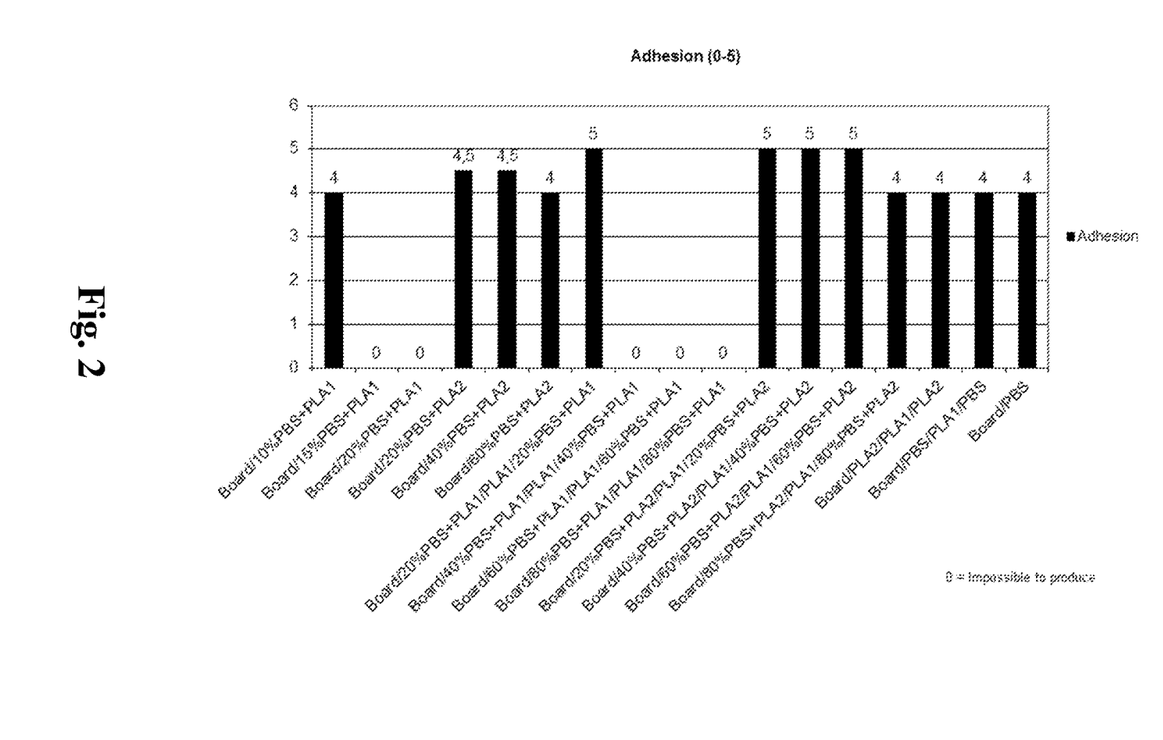
FIG. 2 is a schematic presentation of adhesion properties obtained in various comparative materials and embodiments according to the present invention.

The adhesion results are shown in FIG. 2. In each case use of high melt index PLA in combination with PBS improved the adhesion value. No improvement was detected after 20% PBS concentrations.

Figure 3:
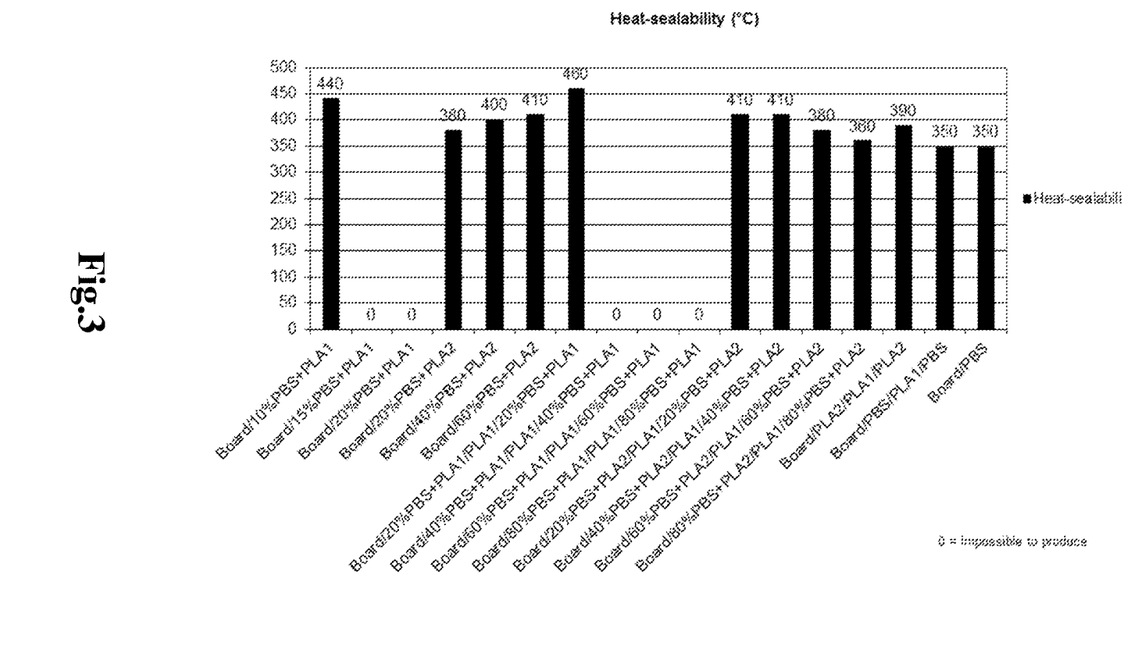
FIG. 3 is a schematic presentation of heat-sealing properties obtained in various comparative materials and embodiments according to the present invention.
Figure 4:
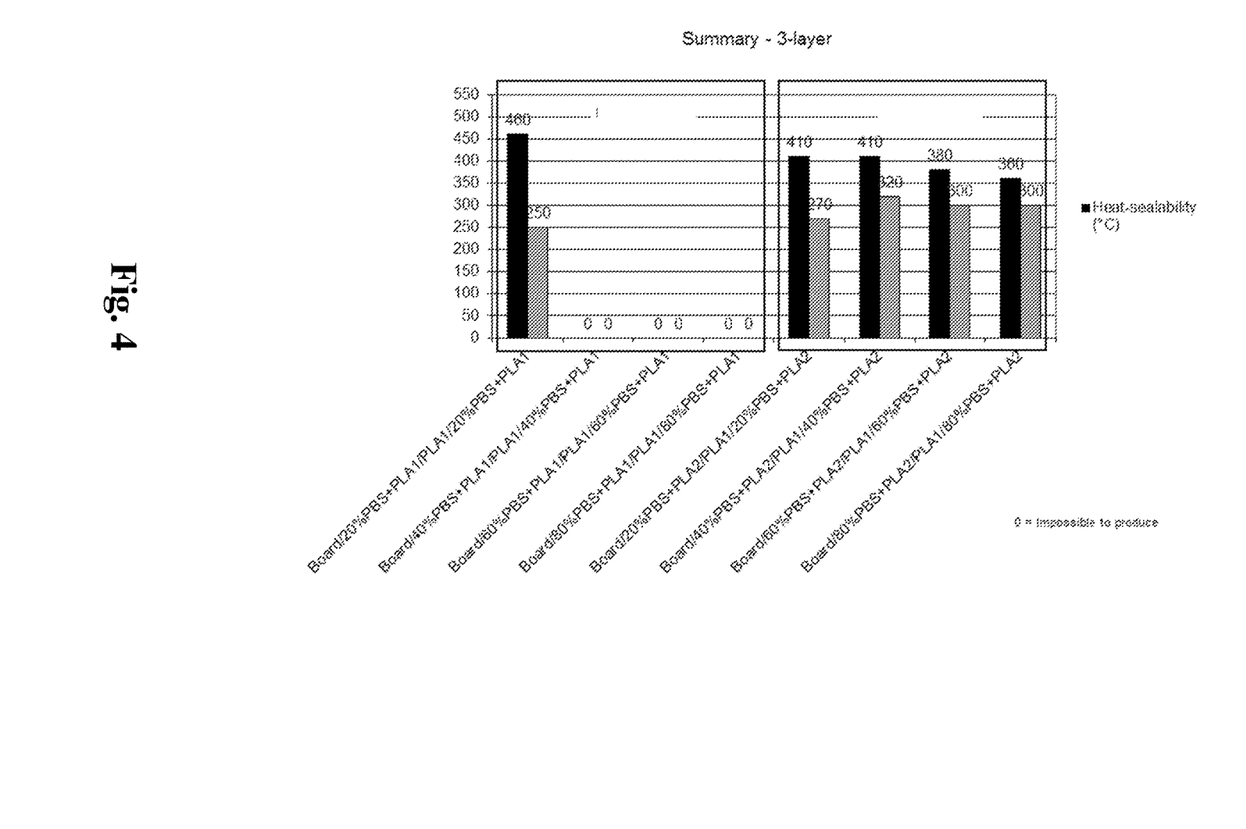
FIG. 4 is a schematic summary of properties of three-layered structures according to the present invention.
Figure 5:
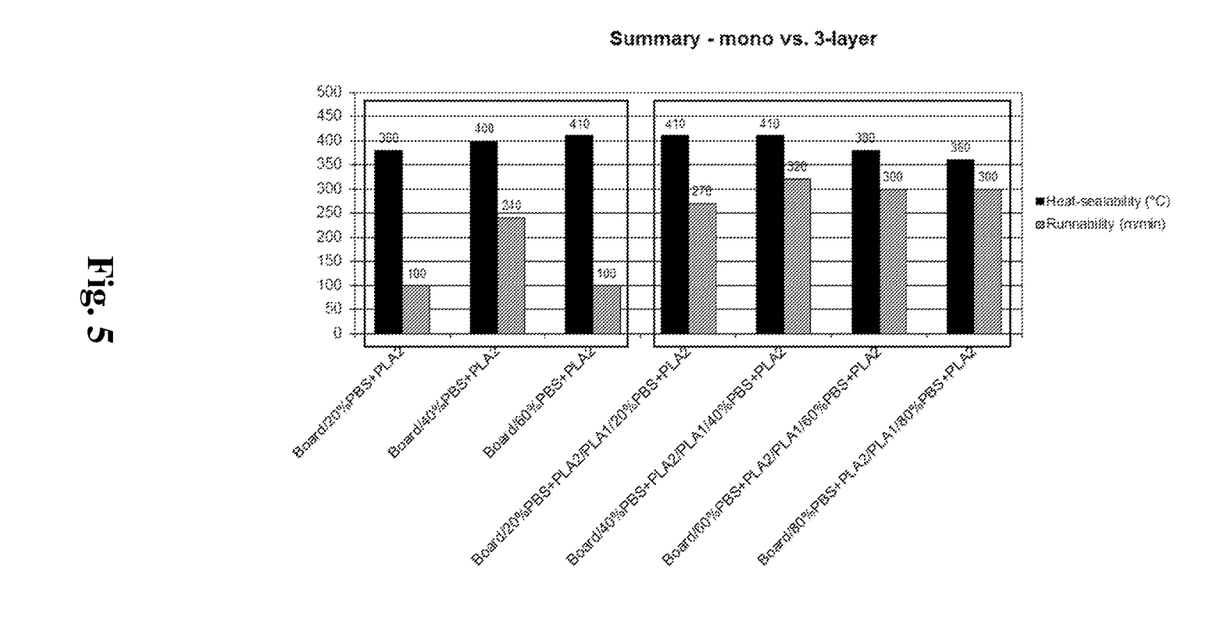
FIG. 5 compares schematically the properties of comparative monolayered structures and three layered structures according to the present invention.

Heat-sealability results are shown in FIG. 3 and show that using high melt index PLA the heat-sealability is significantly improved, c.f. the lower heat-sealing temperatures. In addition it was found that a blend comprising high melt index PLA and PBS can be heat-sealed in a broad temperature range thereby providing flexibility to process (data not shown).

The three layered coating structures (FIG. 6c), where PLA1 is used in the middle layer and PLA2 is blended with PBS in the innermost and outermost layers, were found to be especially beneficial by enabling the highest coating machine speed (runnability) and excellent heat-sealing and adhesion properties. It is believed that PLA1 in the middle layer gives rigidity to film.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the present invention be defined by the attached claims and their legal equivalents, as well as the following illustrative embodiments.

The invention claimed is:

1. A biodegradable packaging material, comprising:
a multilayer coating coextruded on a fibrous substrate, said coextruded multilayer coating comprising (i) an innermost layer of a blend comprising 20-95 wt-% of a first polylactide and 5-80 wt-% of another biodegradable polymer, (ii) a middle layer consisting of 100 wt-% of a second polylactide, and (iii) an outermost layer of a blend comprising 20-95 wt-% of a third polylactide and 5-80 wt-% of another biodegradable polymer, wherein the first polylactide having a higher melt index of more than 35 g/10 min (210° C.; 2.16 kg), the second polylactide having a lower melt index of 5-35 g/ 10 min (210° C.; 2.16 kg), and the third polylactide having a higher melt index of more than 35 g/10 min (210° C.; 2.16 kg).

2. The biodegradable packaging material of claim 1, wherein the same blend has been used for the innermost and the outermost layers of the multilayer coating.

3. The biodegradable packaging material of claim 2, wherein the blends of the innermost and outermost layers comprise 30-60 wt-% of polylactide having a higher melt index of 50-100 g/10 min (210° C.; 2.16 kg), 40-70 wt-% of said another biodegradable polymer, and 0-5 wt-% of an acrylic copolymer.

4. The biodegradable packaging material of claim 1 in the form of a drinking cup having an inner liquid-contact side, the multilayer located on the inner liquid-contact side of the cup.

5. The biodegradable packaging material of claim 1 in the form of a sealed liquid package having an inner liquid-contact side, the multilayer coating located on the inner liquid-contact side of the sealed liquid package.

6. The biodegradable packaging material of claim 1 in the form of a sealed carton package having an outside, the multilayer coating located on the outside of the sealed carton package.

7. The biodegradable packing material of claim 1 in the form of a tray package for ready-made food having at least one food contact side, the multilayer coating located on said at least one food contact side of the tray package.

8. The packaging material of claim 1, wherein the first and third polylactides are the same having the same higher melt index.

* * * * *